(12) United States Patent
Erenay et al.

(10) Patent No.: US 8,590,346 B2
(45) Date of Patent: Nov. 26, 2013

(54) WASHER/DRYER

(75) Inventors: Kerem Erenay, Istanbul (TR); Fehmi Sonmezoz, Istanbul (TR)

(73) Assignee: Arcelik Anonim Sirketi, Istanbul (TR)

( * ) Notice: Subject to any disclaimer, the term of this patent is extended or adjusted under 35 U.S.C. 154(b) by 909 days.

(21) Appl. No.: 12/666,789

(22) PCT Filed: Jun. 16, 2008

(86) PCT No.: PCT/EP2008/057555
§ 371 (c)(1),
(2), (4) Date: Dec. 24, 2009

(87) PCT Pub. No.: WO2009/000690
PCT Pub. Date: Dec. 31, 2008

(65) Prior Publication Data
US 2010/0175431 A1 Jul. 15, 2010

(30) Foreign Application Priority Data
Jun. 26, 2007 (TR) ................ a 2007/04393

(51) Int. Cl.
*D06F 37/42* (2006.01)
(52) U.S. Cl.
USPC ....... 68/12.26; 68/12.16; 68/12.17; 68/12.27; 310/68 C; 318/783
(58) Field of Classification Search
USPC .......... 68/12.24, 12.26–12.27, 12.16–12.175; 310/68 C; 318/786
See application file for complete search history.

(56) References Cited

U.S. PATENT DOCUMENTS

| | | | |
|---|---|---|---|
| 3,499,230 A | | 3/1970 | Slugantz |
| 4,117,526 A | * | 9/1978 | Bates .............. 361/92 |
| 4,225,812 A | * | 9/1980 | Kraus ............. 388/830 |
| 4,286,443 A | * | 9/1981 | Hunter .......... 68/12.12 |
| 4,481,786 A | * | 11/1984 | Bashark .......... 62/160 |
| 4,510,778 A | * | 4/1985 | Cotton .......... 68/12.15 |
| 4,585,964 A | * | 4/1986 | Hildebrandt ..... 310/71 |
| 4,663,538 A | * | 5/1987 | Cotton et al. ..... 307/38 |
| 4,663,948 A | * | 5/1987 | Rummel ........ 68/12.15 |
| 4,890,050 A | * | 12/1989 | Mackevich ....... 322/34 |
| 5,130,624 A | * | 7/1992 | Bashark ......... 318/280 |
| 5,166,592 A | * | 11/1992 | Bashark ......... 318/799 |
| 5,237,256 A | * | 8/1993 | Bashark ......... 318/817 |
| 5,253,494 A | | 10/1993 | Frucco et al. |
| 5,674,008 A | * | 10/1997 | Allinson ........ 374/183 |
| 7,856,854 B2 * | | 12/2010 | Simon .......... 68/12.17 |
| 7,984,628 B2 * | | 7/2011 | Nishio et al. .... 68/12.01 |

(Continued)

FOREIGN PATENT DOCUMENTS

| | | |
|---|---|---|
| EP | 0504545 A | 9/1992 |
| EP | 0702103 A | 3/1996 |

(Continued)

*Primary Examiner* — Joseph L. Perrin
*Assistant Examiner* — Kevin G Lee
(74) *Attorney, Agent, or Firm* — Venable, Campillo, Logan & Meaney PC

(57) ABSTRACT

The present invention relates to a washer/dryer (1), the drum of the washer/dryer (1) is rotated by an electric motor (2), and over heating of the electric motor (2) is controlled by a thermal protector (8) that cuts off the current passing through it when the detected temperature exceeds a predetermined limit value. The thermal protector (8) is energized by the triac (7) that drives the door lock (6) and thereby is prevented from being subjected to high currents.

6 Claims, 2 Drawing Sheets

(56) References Cited

U.S. PATENT DOCUMENTS

Figure 1:
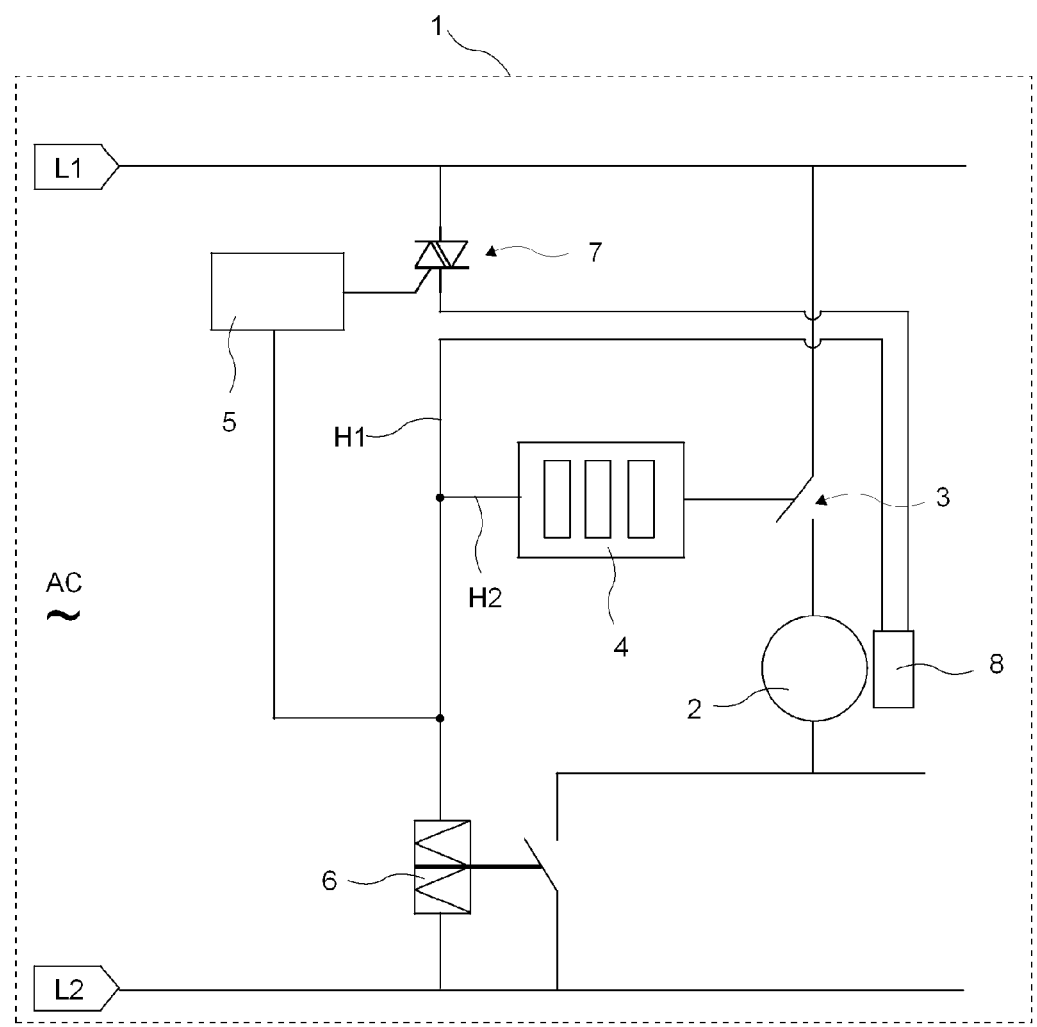

| | | | |
|---|---|---|---|
| 8,276,290 B2 * | 10/2012 | Uhara et al. | 34/275 |
| 2005/0194026 A1 * | 9/2005 | Lu | 134/105 |
| 2005/0223506 A1 * | 10/2005 | Kwen et al. | 8/159 |
| 2007/0085503 A1 | 4/2007 | Menniger | |

FOREIGN PATENT DOCUMENTS

| | | | |
|---|---|---|---|
| EP | 702103 A1 * | 3/1996 | |
| EP | 0808935 A | 11/1997 | |
| EP | 1775366 A | 4/2007 | |
| JP | 08182896 A | 7/1996 | |

* cited by examiner

WASHER/DRYER

The present invention relates to a washer/dryer comprising an electric motor wherein a thermal protector is utilized against overheating.

In a household appliance, for example in a washing machine, thermal protectors are utilized for the protection of electric motors against overheating and high currents that arise under conditions like the locking of the rotor. The most preferred thermal protectors are the bimetal type comprising stationary and movable parts. The bimetal thermal protector functions like an electric switch, wherein the stationary part is in contact with the movable part during normal operation of the electric motor, and when the electric motor is overheated due to overloading, the movable part is deformed with the effect of heat, losing contact with the stationary part and not allowing the flow of electric current. The thermal protector can be situated on the motor windings or anywhere the heat can be detected and is connected in series to the motor windings to stop the operation of the electric motor by cutting off the electricity in conditions of overheating and/or excessive rise in the current.

In an electric motor driven by DC current, if the thermal protector sensitive to high current and overheating is connected in series to the circuit wherein the DC current flows, for example to the motor windings, it will malfunction in a short period of time and will not be able to serve since it will be subjected to continuous high current, therefore it cannot be connected to the motor windings through which the DC current flows.

In order to solve this problem, in a brushless DC electric motor as cited in the Great Britain Patent No GB2249441, the AC supply delivered to the motor control circuit is changed to DC through a rectifier and the thermal protector is connected in series to the AC voltage line but not to the motor windings wherein the DC current flows.

The aim of the present invention is the realization of a washer/dryer wherein the thermal protector protecting the electric motor against overheating is prevented from damage through being affected by high currents.

The washer/dryer realized in order to attain the aim of the present invention is explicated in the claims.

In the washer/dryer, overheating of the electric motor actuating the drum is controlled by a thermal protector and the thermal protector is prevented from being subjected to high currents and damaged by being energized with the triac that generates a low voltage which is also used in energizing the washer/dryer door lock.

In an embodiment of the present invention, the thermal protector terminals are connected in series at the triac outlet both to the door lock and the relay control circuit, thereby not only halting the motor but also turning off the energy delivered to the door lock when the thermal protector is opened.

In another embodiment of the present invention, the thermal protector terminals are connected in series at the triac outlet only to the line leading to the relay control circuit and halt only the motor without intervening with the door lock when the thermal protector is opened.

The washer/dryer realized in order to attain the aim of the present invention is illustrated in the attached figures, where:

FIG. 1—is the schematic view of a control circuit in a washer/dryer.

Figure 2:
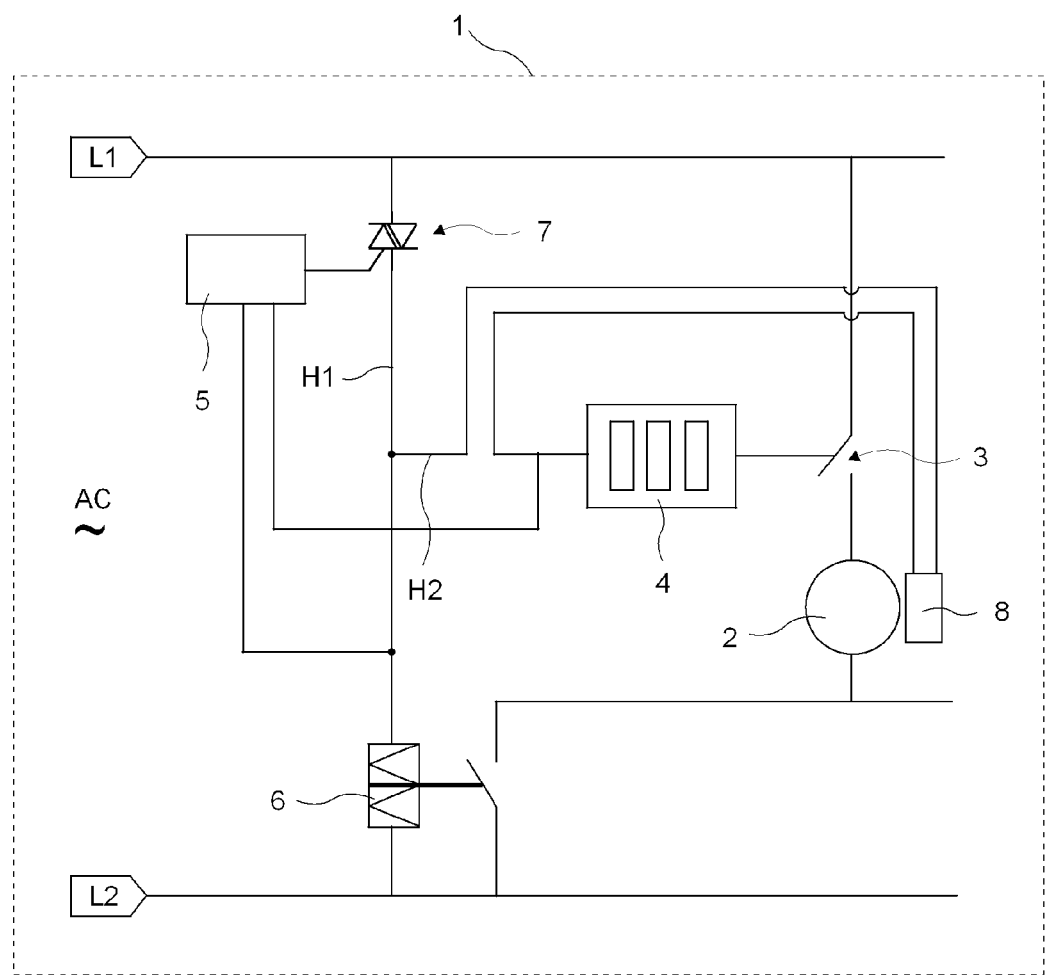

FIG. 2—is the schematic view of the control circuit in a washer/dryer in another embodiment of the present invention.

The elements illustrated in the figures are numbered as follows:
1. Washer/dryer
2. Electric motor
3. Relay
4. Relay control circuit
5. Microprocessor
6. Door lock
7. Triac
8. Thermal protector The washer/dryer (1) comprises an electric motor (2) that actuates the drum wherein the laundry is emplaced, one or more relays (7) that is energized with control signals received and changes to the active-passive mode for actuating, halting or changing the operational direction of the electric motor (2), a relay control circuit (4) that sends the signals which control the relay (3) and a microprocessor (5) that maintains the implementation and control of the washing program.

The washer/dryer (1) furthermore comprises a door for accessing the drum containing the laundry, a door lock (6), for example the bimetal type, that is locked when energized, and unlocked at the end of a delay period when de-energized thereby allowing the door to be opened after the drum stops rotating with the effect of inertia, a triac (7) that activates the door lock (6) by operating the PTC (Positive Temperature Coefficient) thermistor and a thermal protector (8) disposed in the electric motor (2), that cuts off the current passing through it by becoming open circuit when the temperature of the electric motor (2) exceeds a predetermined limit value.

A connection line (H1) is provided between the triac (7) and the door lock (6) and the relay control circuit (4) is connected to the connection line (H1) by means of a second connection line (H2) branching from the said connection line (H1), the voltage generated by the triac (7) is delivered to the door lock (6) through the connection line (H1), and to the relay control circuit (4) through the connection line (H1) and the second connection line (H2).

The washer/dryer (1) of the present invention comprises a thermal protector (8) connected in series between the triac (7) driving the door lock (6) and the relay control circuit (4) and by being fed with the low voltage generated by the triac (7) is thus prevented from damage due to high currents.

During the normal operation of the electric motor (2) the thermal protector (8) remains closed and allows the current to flow through it, not interrupting the transmission between the triac (7) and the relay control circuit (4). The voltage generated by the triac (7) reaches the relay control circuit (4) and thereby actuates the relay control circuit (4), energizes the relay (3) and operates the electric motor (2). When the temperature of the electric motor (2) exceeds the limit value, the thermal protector (8) opens, not allowing the current to flow through it, interrupting the transmission between the triac (7) and the relay control circuit (4) connected in series thereto and thus turns off the current delivered to the relay control circuit (4) and hence the relay (3) and halts the electric motor (2). The thermal protector (8) not only detects the temperature of the electric motor (2) but also functions by being fed with the low voltage generated by the triac (7) without being subjected to high currents.

In an embodiment of the present invention, the thermal protector (8) terminals are connected to the connection line (H1) at the triac (7) outlet such that it can be connected in series both to the door lock (6) and the relay control circuit (4) (FIG. 1). When the thermal protector (8) opens at high temperature, the current delivered from the triac (7) both to the relay control circuit (4) and the door lock (6) is turned off. Thus the electric motor (2) is halted when the thermal protector (8) opens, and at the same time the door lock (6) is released since the energy delivered to the door lock (6) is also interrupted and the laundry can be unloaded by opening the door. The door lock (6) operates by means of elements such as PTC thermistor and changes to the free mode to open the washer dryer (1) door, some time after being de-energized. In the delay period passing until the door lock (6) is released (for example 90 seconds), the microprocessor (5) receiving the data from the connection line (H1) that the thermal protector (8) has interrupted the current flow in the circuit, sends the signal for discharging the water in the tub and water is discharged in this delay period thereby preventing water from flowing outside when the door is opened.

In another embodiment of the present invention, the thermal protector (8) terminals are connected in series to the second connection line (H2) branching to the relay control circuit (4) from the connection line (H1) between the triac (7) and the door lock (6) such that it can be connected in series only to the relay control circuit (4) at the triac (7) outlet (FIG. 2), and thus when the thermal protector (8) opens, only the energy delivered from the triac (7) to the relay control circuit (4) is turned off. When the thermal protector (8) opens, the energy delivered to the door lock (6) is not interrupted and the door is kept locked. In this embodiment, the control of the door lock (6) is provided by the microprocessor (5) receiving data from the connection line (H1) and the second connection line (H2) that the thermal protector (8) is opened.

By means of the embodiment of the present invention, particularly in places wherein the voltage received from the main power supply is irregular, the thermal protector (8) is not fed by the AC voltage and by the high DC voltage conveying lines feeding the electric motor (2), but instead is fed by the voltage generated by the triac (7) actuating the door lock (6) and is not subjected to high currents and current fluctuations, hence damage is prevented and a longer service life is provided.

The invention claimed is:

1. A washer/dryer comprising an electric motor that actuates a drum wherein laundry is emplaced, one or more relays that is energized with a control signals received and changes to an active-passive mode for actuating, halting or changing the operational direction of the electric motor, a relay control circuit that sends the signals which control the relay and a microprocessor that maintains an implementation and control of a washing program, a door lock that is not controlled by the microprocessor and is locked when energized, and unlocked at the end of a delay period when de-energized, a triac that actuates the door lock and a thermal protector disposed in the electric motor that cuts off the current passing through it, by becoming open circuit when the temperature of the electric motor exceeds a predetermined limit value, wherein the thermal protector is connected between the triac driving the door lock and the relay control circuit and by being fed with a low voltage generated by the triac is thus prevented from damage due to high currents.

2. A washer/dryer as in claim 1, characterized by a connection line (H1) provided between the triac and the door lock, and the relay control circuit that is connected to the connection line (H1) by a second connection line (H2) branching from the said connection line (H1).

3. A washer/dryer as in claim 2, characterized by the thermal protector, the terminals of which are connected to the connection line (H1) such that it is connected in series both to the door lock and the relay control circuit at the triac outlet.

4. A washer/dryer as in claim 3, characterized by the microprocessor that receives data from the connection line (H1) connected thereto that the thermal protector has interrupted the circuit, and when the door lock is de-energized, sends the signal for discharging the water in the tub during the delay period until the door opens.

5. A washer/dryer as in claim 2, characterized by a thermal protector, the terminals of which are connected to the second connection line (H2) branching to the relay control circuit from the connection line (H1) between the triac and the door lock such that it can be connected only to the relay control circuit at the triac outlet.

6. A washer/dryer as in claim 5, characterized by a microprocessor that controls the door lock by receiving data from the connection line (H1) and the second connection line (H2) that the thermal protector is opened.

\* \* \* \* \*